United States Patent [19]

Tanaka et al.

[11] Patent Number: 5,164,203

[45] Date of Patent: * Nov. 17, 1992

[54] PLASTIC MOLDING DEVICE FOR A SEMICONDUCTOR ELEMENT

[75] Inventors: Minoru Tanaka; Itaru Matsuo, both of Fukuoka, Japan

[73] Assignee: Mitsubishi Denki Kabushiki Kaisha, Tokyo, Japan

[*] Notice: The portion of the term of this patent subsequent to Jul. 5, 2005 has been disclaimed.

[21] Appl. No.: 831,646

[22] Filed: Feb. 7, 1992

Related U.S. Application Data

[63] Continuation of Ser. No. 371,845, Jun. 27, 1989, abandoned, which is a continuation of Ser. No. 174,816, Mar. 29, 1988, Pat. No. 4,904,173, which is a continuation of Ser. No. 829,087, Feb. 13, 1986, Pat. No. 4,755,124.

[30] Foreign Application Priority Data

| Feb. 13, 1985 | [JP] | Japan | 60-26841 |
| Feb. 13, 1985 | [JP] | Japan | 60-26842 |
| Feb. 13, 1985 | [JP] | Japan | 60-26844 |
| Feb. 13, 1985 | [JP] | Japan | 60-26845 |
| Feb. 13, 1985 | [JP] | Japan | 60-26847 |
| Feb. 13, 1985 | [JP] | Japan | 60-26848 |
| Feb. 13, 1985 | [JP] | Japan | 60-26850 |
| Feb. 13, 1985 | [JP] | Japan | 60-26851 |
| Feb. 13, 1985 | [JP] | Japan | 60-26852 |
| Sep. 30, 1985 | [JP] | Japan | 60-218611 |
| Sep. 30, 1985 | [JP] | Japan | 60-218612 |

[51] Int. Cl.[5] ............................. B29C 3/06
[52] U.S. Cl. ............................. 425/149; 425/150; 425/167; 425/259; 425/593
[58] Field of Search ............... 425/149, 150, 167, 259, 425/450.1, 451.6, 593

[56] References Cited

U.S. PATENT DOCUMENTS

| 1,298,749 | 4/1919 | McManus . | |
| 1,922,937 | 8/1933 | Eckert | 425/451.6 X |
| 2,484,344 | 10/1949 | Hiller et al. . | |
| 2,916,770 | 12/1959 | Lemoine . | |
| 3,080,610 | 3/1963 | Baigent . | |
| 3,184,810 | 5/1965 | Hoern . | |
| 3,319,298 | 5/1967 | Kiraly . | |
| 3,452,399 | 7/1969 | Blumer | 425/451.6 X |
| 3,534,442 | 10/1970 | Mahle | 425/150 |
| 3,604,058 | 9/1971 | Fischbach et al. | 425/150 |
| 3,642,405 | 2/1972 | Eggenberger et al. | 425/149 |
| 3,723,037 | 3/1973 | Formo . | |
| 4,021,182 | 5/1977 | Resch | 425/451.6 |
| 4,131,596 | 12/1978 | Allen | 425/150 |
| 4,235,577 | 11/1980 | Groleau | 425/161 |
| 4,281,977 | 8/1981 | Farrell | 425/149 |
| 4,422,838 | 12/1983 | Iwawaki et al. . | |
| 4,540,359 | 9/1985 | Yamazaki . | |
| 4,579,515 | 4/1986 | Kawaguchi et al. . | |
| 4,601,653 | 7/1986 | Inaba . | |
| 4,755,124 | 7/1988 | Tanaka | 425/149 |

FOREIGN PATENT DOCUMENTS

| 1231883 | 1/1967 | Fed. Rep. of Germany . | |
| 59-9538 | 1/1984 | Japan . | |
| 59-187862 | 10/1984 | Japan . | |
| 60-139421 | 7/1985 | Japan | 425/150 |

Primary Examiner—Charles Hart

[57] ABSTRACT

A plastic molding device for a semiconductor element for plastic molding a semiconductor element on a lead frame, which comprises: an upper platen, a lower platen, and a movable platen movably provided at a tie bar which is provided between said two platens; an upper metal mold and a lower metal mold provided at the upper platen and the movable platen, respectively; a motor for applying a raising force for driving the movable platen; a driving force conversion mechanism for converting the rotation force of the motor into a reciprocative force; and a double toggle mechanism for giving the reciprocative force to the movable platen.

1 Claim, 10 Drawing Sheets

PLASTIC MOLDING DEVICE FOR A SEMICONDUCTOR ELEMENT

This application is a continuation of application Ser. No. 07/371,845 filed on Jun. 27, 1989, now abandoned, which is a Rule 60 continuation of Ser. No. 07/174,816 filed on Mar. 29, 1988, now U.S. Pat. No. 4,904,173, which is a Rule 60 continuation of Ser. No. 06/829,087 filed on Feb. 13, 1986, now U.S. Pat. No. 4,755,124.

FIELD OF THE INVENTION

The present invention relates to a plastic molding device for a semiconductor element for plastic molding a semiconductor element on a lead frame.

BACKGROUND OF THE INVENTION

Generally, a plastic molding device for a semiconductor element has an upper platen for holding an upper metal mold, a lower platen as a base, and a movable platen for holding a lower metal mold. The movable platen is raised to mold-clamp the upper and the lower metal molds, and a lead frame and a semiconductor element placed between the molds are plastic molded.

Figure 1:
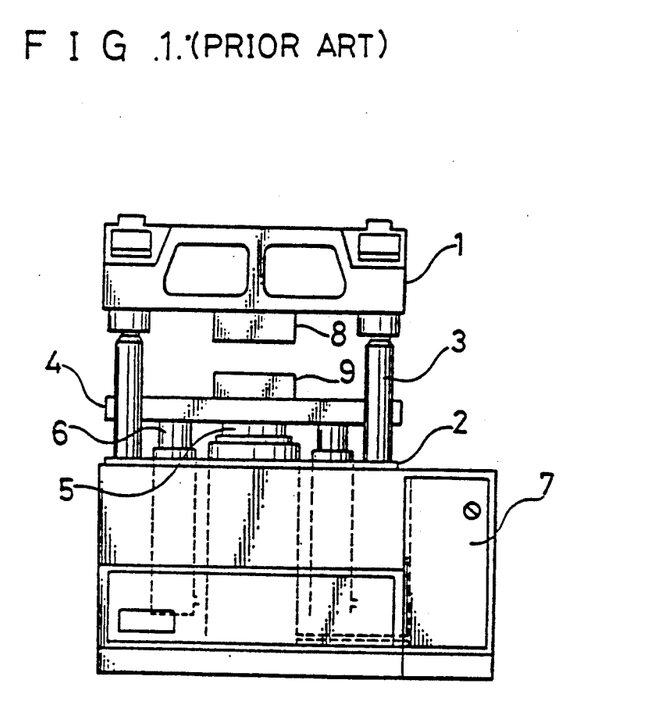
FIG. 1 is a schematic view showing a prior art plastic molding device for a semiconductor element.

FIGS. 1 and 1a show a prior art plastic molding device for a semiconductor element. An upper platen is provided for holding an upper metal mold 8. A tie bar 3 is provided between the upper platen 1 and the lower platen 2. There is also provided a movable platen 4 between the upper platen 1 and the lower platen 2. In order to conduct mold clamping the movable platen 4 is driven upwardly by a main oil pressure piston 5 and auxiliary oil pressure pistons 6, and the lower metal mold 9 fixed on the movable platen 4 is pushed towards the upper metal mold 8. Then, a plastic molding tablet 31 is inserted into the tablet insertion aperture 30 provided in plurality inside the lower metal mold 9, and there are placed a lead frame and a semiconductor element on the lower metal mold 9. A power unit 7 including a motor and an oil pressure tank is provided for supplying oil pressure to cylinders each containing the main oil pressure piston 5 and the auxiliary oil pressure piston 6.

After the mold clamping is conducted the press pressure is held at a predetermined pressure, and the plunger 32 provided at the lower metal mold 9 is driven to rise up by an oil pressure so as to inject plastics into the metal mold. After the semiconductor element is plastic molded by the injected plastics, the movable platen 4 is lowered so as to separate the upper metal mold 8 and the lower metal mold 9, and the plastic molded lead frame is taken out.

In this prior art device the plunger 32 is driven by oil pressure, whereby it is difficult to adjust the speed of the plunger 32 and the press pressure at high precision, resulting in difficulty in a stable plastic molding. Additionally, the maintenance of the device becomes quite troublesome because inspection for oil leakage and exchange of sealing member are required. Furthermore, the device including the power unit occupies a large space, resulting in an increased cost.

Another prior art plastic molding device for a semiconductor element is disclosed in Japanese Utility Model Laid-open Publication No. Sho. 59-9538. In this device a DC servomotor is used for driving a spindle for plastics injection, wherein the spindle is provided with a plunger.

SUMMARY OF THE INVENTION

It is an object of the present invention to provide a plastic molding device for a semiconductor element capable of making the maintenance thereof easy, adjusting the pressure easily at a high precision, and further miniaturizing the whole device and reducing the cost of the device.

It is a second object of the present invention to provide a plastic molding device for a semiconductor element of motor-operated system capable of transmitting the driving force of a motor without the use of gears, and further obtaining a simple construction with no oil leakage.

It is a third object of the present invention to provide a plastic molding device for a semiconductor element capable of conducting a plastic molding with high accuracy even if the metal molds are curved due to the pressure.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a plastic molding device for a semiconductor element for plastic molding a semiconductor element on a lead frame, which comprises: an upper platen, a lower platen, and a movable platen movably provided at a tie bar which is provided between said two platens; an upper metal mold and a lower metal mold provided at the upper platen and the movable platen, respectively; a motor for applying a driving force for driving the movable platen to rise up; a driving force conversion mechanism for converting the rotation force of the motor into a reciprocative force; and a double toggle mechanism for giving the reciprocative force to the movable platen.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1a is an enlarged cross-sectional view showing a portion including the plunger of FIG. 1;

DETAILED DESCRIPTION OF THE PREFERRED EMBODIMENTS

Figure 2:
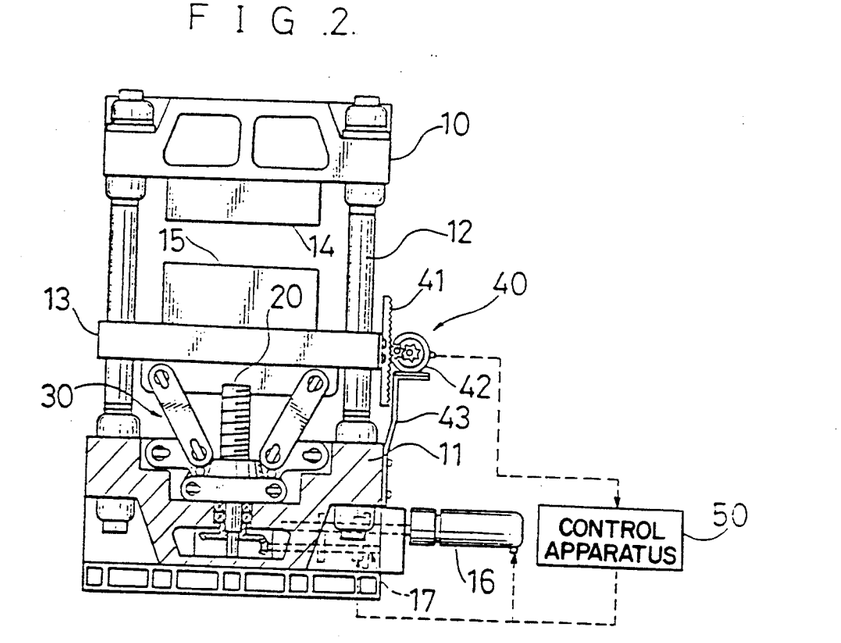
FIG. 2 is a schematic view showing the whole construction of a plastic molding device for a semiconductor element according to one embodiment of the present invention.
Figure 3:
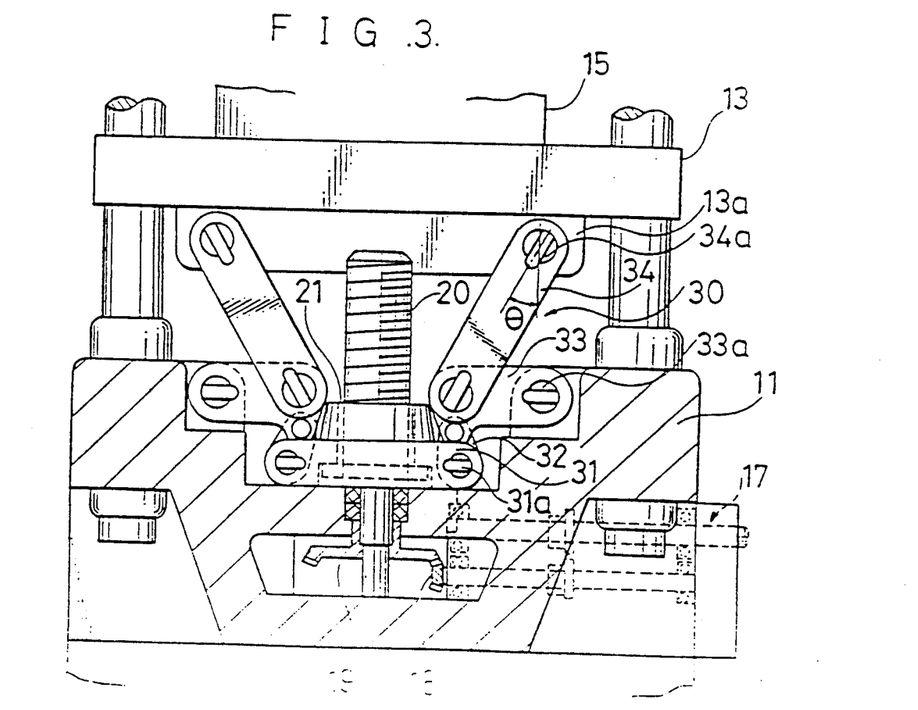
FIG. 3 is an enlarged view of one portion of the device of FIG. 2.
Figure 4:
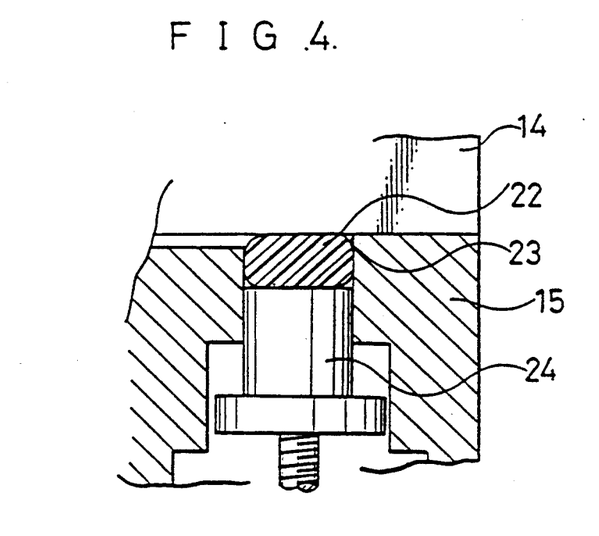
FIG. 4 is an enlarged cross-sectional view showing the plunger portion thereof.

In order to explain the present invention in detail, reference will be particularly made to FIGS. 2, 3 and 4.

In the above noted Figures, the reference numeral 10 designates an upper platen, the numeral 11 designates a lower platen, the numeral 12 designates a tie bar provided between the upper platen 10 and the lower platen 11. The numeral 13 designates a movable platen movably provided at the tie bar 12. The numeral 14 designates an upper metal mold fixed to the upper platen 10. The numeral 15 designates a lower metal mold fixed to the movable platen 13. A plurality of tablet insertion apertures 23 into which nolding plastic (tablet) 22 is inserted are provided at the lower metal mold 15 as shown in FIG. 4, and a plunger 24 is provided in the aperture 23 movably up and downwards, and it is driven by an external plunger driving apparatus.

The reference numeral 16 designates an AC servomotor for giving a driving force for driving the movable platen 13 upwards. The numeral 17 designates a torque transmission system for transmitting the driving force of the AC servomotor 16 to the movable platen 13. The numeral 18 designates a small bevel gear provided at the output axis of the torque transmission system 17. The numeral 19 designates a large bevel gear engageable with the small bevel gear 18. The numeral 20 designates a ball screw at one end of which the large bevel gear 19 is fixed. The numeral 21 designates a nut engageable with the ball screw 20. A driving force conversion mechanism for converting the rotation force of the AC servomotor 16 into a reciprocative force is constituted by the ball screw 20 and the nut 21.

Furthermore, the numeral 30 designates a double toggle mechanism intended to receive the reciprocative force from the driving force conversion mechanism, to convert this force into a tremendously large force, and to give it to the movable platen 13. This double toggle mechanism is constituted symmetrically at the left and right viewed from the center of the ball screw 20.

The construction of the right side portion shown in the drawing is described. The numeral 31 designates a nut housing as an input link to the center of which the nut 21 is fixed. The numeral 32 designates an intermediate link whose one end is connected to the nut housing 31 rotatably. The numeral 33 designates an L-shaped link having an L-shaped transverse cross-section whose one end is rotatably connected to the lower platen 11, and whose other end is connected to the other end of the intermediate link 32, respectively. The numeral 34 designates an output link whose one end is rotatably connected to the L-shaped link 33, and whose other end is rotatably connected to the rib 13a provided at the lower surface of the movable platen 13. In this embodiment the mold clamping by the upper metal mold 14 and the lower metal mold 15 is conducted in a position that the output link 34 is positioned vertically, that is, at the neighborhood of the position where the double toggle mechanism 30 is located at the uppermost dead point.

Figure 6:
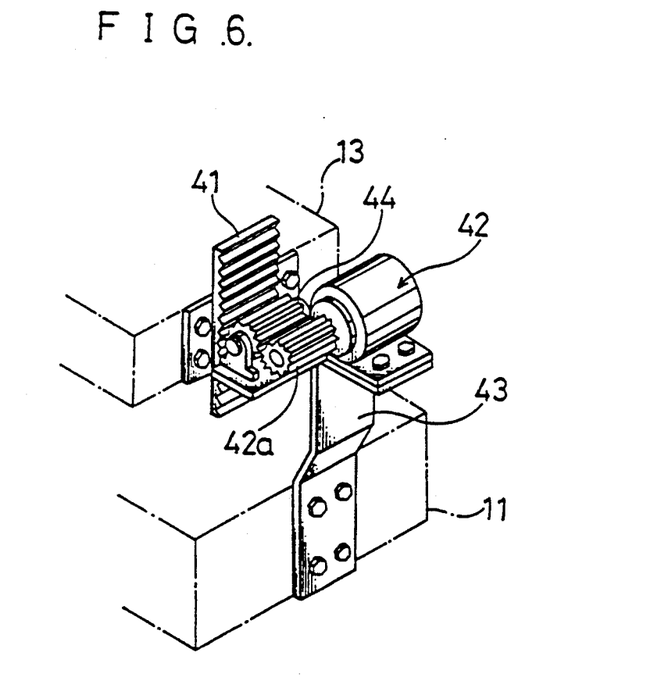
FIG. 6 is an enlarged perspective view showing the position detection means of the device.

The reference numeral 40 designates a position detection means provided at the movable platen 13 for detecting the position of the movable platen 13. As seen in FIG. 6, this position detection means comprises a rotary encoder 42 including a rack 41 fixed to the movable platen 13 and a pinion 42a which is rotated by the movement of the rack 41 through a gear 44, and this rotary encoder 42 is fixed to a stay 43 attached to the lower platen 11.

Figure 7:
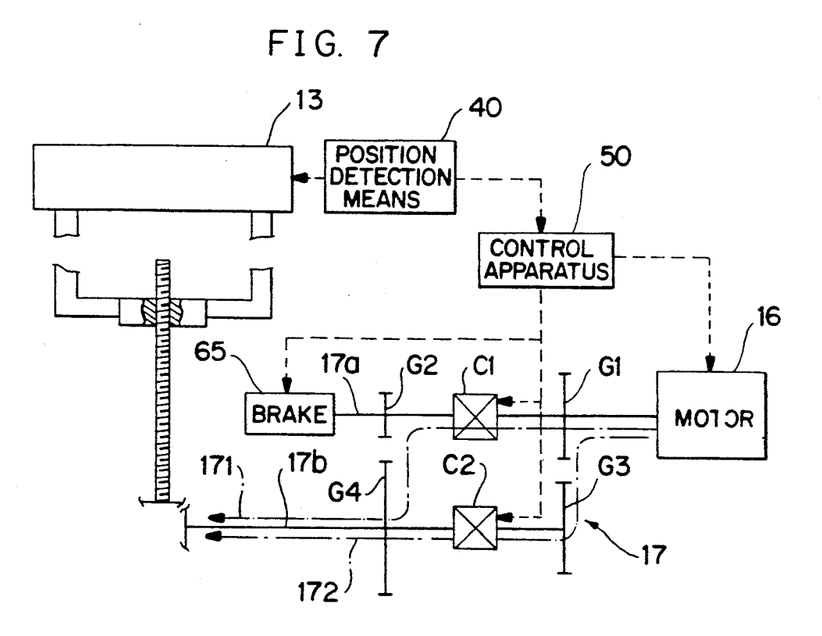
FIG. 7 is a schematic view showing a construction of the torque transmission system and the control system of the device.

FIG. 7 shows an example of a construction of the torque transmission system 17. In this torque transmission system 17 a first torque transmission series 171 having a large reduction ratio is constituted by a first input gear G1, a first clutch C1, an input axis 17a, a second input gear G2, a second output gear G4, and an output axis 17b, and a second torque transmission series 172 having a small reduction ratio is constituted by the first input gear G1, a first output gear G3, a second clutch C2, the second output gear G4, and an output axis 17b. These two torque transmission series 171 and 172 are switched by clutches C1 and C2, and the speeds thereof are controlled by a brake 65 at a desired time. The numeral 50 designates a control apparatus designed to receive the output from the position detection means 40 at its input, and to control the AC servomotor 16 and the brake 65, and to switch the torque transmission system 17.

The device will be operated as follows:

At first the movable platen 13 is returned to the original position of the automatic operation. In this state a lead frame and a semiconductor device are loaded to the lower mold 15 by an inloader, and a tablet 22 is inserted into the tablet insertion aperture 23 of the lower mold 15, and thereafter an operation start switch of the device is turned on. Then, the AC servomotor 16 starts to rotate, and the rotation force of the motor 16 is transmitted to the ball screw 20 through the driving force transmission system 17, and the bevel gear pairs 18 and 19. Then, the ball screw 20 rotates and the nut 21, that is, the nut housing 31 which is engaged with the ball screw 20 rises up. Thus, the rotation force of the motor 16 is converted into a reciprocative force, and this force is transmitted to the movable platen 13 through the double toggel mechanism 30. In the initial state of operation the first clutch C1 is turned off, and the second clutch C2 is turned on, controlled by the control apparatus 50. Accordingly, the rotation force of the AC servomotor 16 is transmitted through the second torque transmission series 172 having a small reduction ratio. As a result, the movable platen 13 rises up quickly.

The position of the movable platen 13 is detected with high precision by the position detection means 40. That is, the rack 41 fixed to the movable platen 13 moves together with the movement of the movable platen 13, and the pinion 42a of the rotary encoder 42 is rotated by that movement transmitted through the gear 44. Thus the rotary encoder 42 outputs pulses of a number in accordance with the stroke of the movable platen 13, and these are counted by the control apparatus 50 to detect the position thereof.

The operation of the double toggle mechanism 30 will be described in greater detail. As the double toggle mechanism 30 is provided symmetrically at the left and right side, only the operation of the right side portion is described.

Figure 5:
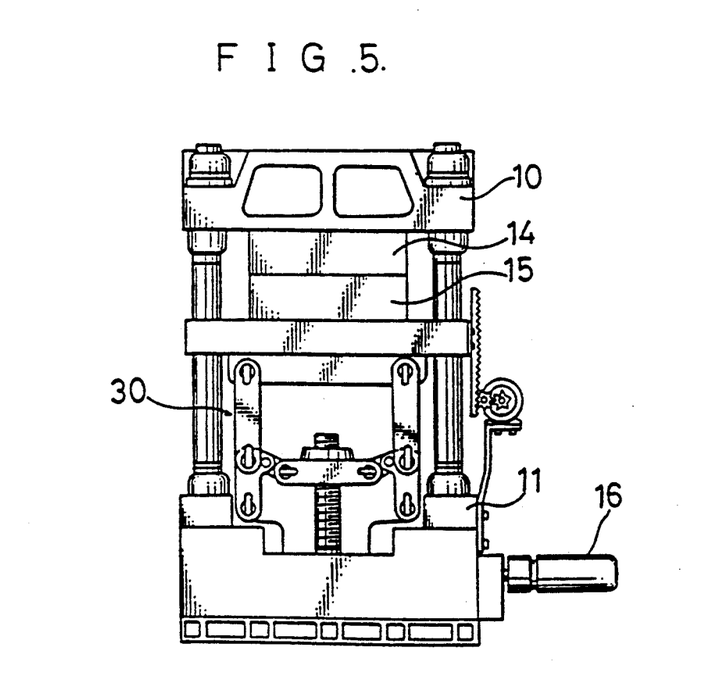
FIG. 5 is a schematic view showing the mold clamping state of the device.

When the nut housing 31 rises up by the rotation of the ball screw 20, the intermediate link 32 rotates in clockwise direction with the supporting point 31a as its center together with the rising up of the nut housing 31. At the same time the L-shaped link 33 rotates in clockwise direction with the supporting point 33a as its center, whereby the output link 34 pushes up the movable platen 13, rotating in counter-clockwise direction with the supporting point 34a as its center. As the angle $\theta$ shown in FIG. 3 gradually becomes smaller as the movable platen 13 rises, the double toggle mechanism 30 inherently generates a tremendously large force in the neighborhood of a position where the angle $\theta$ becomes 0, that is, in the neighborhood of the uppermost dead point (refer to FIG. 5).

Figure 8:
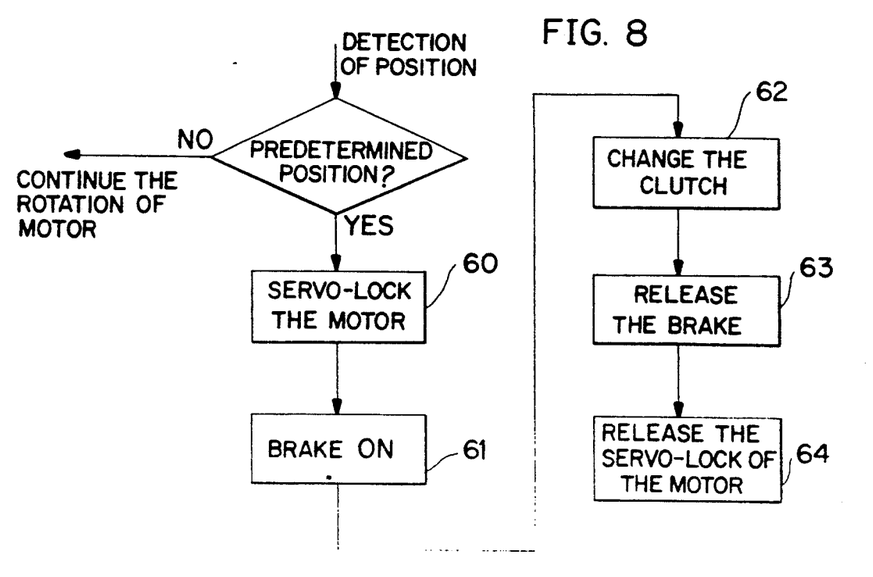
FIG. 8 is a diagram showing a flow chart for exemplifying the operation.

When the movable platen 13 rises up to the neighborhood of the mold clamping position and it is detected that the movable platen 13 has come close to a predetermined position by the position detection means 40, the control apparatus 50 controls the whole system in accordance with the flowchart shown in FIG. 8.

At first the AC servomotor 16 is servolocked (step 60), and its rotation is stopped for a while. Thereafter, the brake 65 is driven to control the speed of the torque transmission system 17 (step 61), and the clutches are switched, that is, the second clutch C2 is turned off and the first clutch C1 is turned on (step 62). Thereafter, the brake 51 is released (step 63), and the servolock of the AC servomotor 16 is released (step 64), and the motor 16 is restarted.

Thus, the rotation force of the AC servomotor 16 is transmitted through the first torque transmission series 171, and accordingly, the movable platen 13 continues to rise up again at a slow speed and with a large driving force, and the lower mold 15 and the upper mold 14 are mold clamped at a predetermined pressure. A plastic molding onto the lead frame is conducted in this mold clamping state. That is, the plunger 24 provided at the lower mold 15 is driven by the driving apparatus (not shown), and thus the tablet 22 is injected into the mold. The pressure of the plunger 24 is held at the predetermined pressure for a predetermined time period, thereby to conduct a plastic molding.

When this plastic molding is completed, the movable platen 13 is lowered after the plunger 24 and the tablet 22 are separated, and the plastic molded lead frame is separated from the lower mold 15. Thereafter, the plastic molded lead frame is taken out by an outloader to proceed to the next process. Thereafter, the movable platen 13 rises up to the cleaning point, and the surface of the lower mold 15 is cleaned by a cleaner and returns to the original position.

According to the present embodiment under such a construction, the means for obtaining a press pressure is constituted not by a conventional oil pressure system but by a motor-operated system, thereby enabling the press pressure to be adjusted with high accuracy and a good responsibility, and a plastic molding is always conducted at a high accuracy. Furthermore, the whole device includes no oil pressure system for the power unit and is small in size and is low cost. The maintenance requirements are therefore lessened.

The torque transmission system is constituted by two different series having different reduction ratios, thereby eliminating the necessity to provide two AC servomotors one for high speed rotation and small torque capacity for high speed forwarding, and one for low speed rotation and large torque capacity for mold clamping. The high speed forwarding and the mold clamping can be conducted by one small capacity AC servomotor, resulting in a small sized and low cost motor.

A ball screw 20 and a nut 21 are used to constitute driving force conversion mechanism of a high efficiency, and accordingly, there is a possibility that the movable platen 13 is lowered while both clutches C1 and C2 are off during the switching of the clutches. In this embodiment, however, the torque transmission system 17 is braked by the brake 65 before the clutch C2 is turned off, thereby preventing the movable platen 13 from lowering during the switching period of the torque transmission system 17. Accordingly, it is possible to conduct a position detection accurately, and to conduct a plastic molding at high precision by moving the movable platen 13 smoothly. Furthermore, the brake 65 is provided at the input axis 17a, thereby enabling the use of a brake having small brake torque capacity, whereby the device is further miniaturized and made less expensive.

Furthermore, in this embodiment under such construction the clutches C1 and C2 are of normal open types which are off when a current is not flowing, and therefore, there might be an anxiety that the movable platen 13 will lower when clutches C1 and C2 are turned off by such as the stoppage of the power supply. However, a normal closed type brake 65 in which a brake function is operated in a state where a current is not flowing can be used to secure the safety in an abnormal state.

In the illustrated embodiment the brake is provided at the input axis, but it can be provided at any place beyond the clutch, for example, at the output axis. In this case, however, a brake having a large brake torque capacity by an amount corresponding to the reduction ratio is required as compared with the above embodiment.

In the illustrated embodiment the position of the platen 13 is detected by using the rack 41 provided at the movable platen 13. This enables easy and precise position detection with no consideration with respect to sliding clutches or the link ratio of the toggle mechanism. Accordingly, it is possible to control the press pressure at the mold clamping securely, resulting in a plastic molding of high precision.

In the illustrated embodiment a rotary encoder is used as a position detection means, but a linear scale or a potentiometer can be used. An incremental type encoder which outputs only pulses is used as a rotary encoder, but an absolute type encoder which outputs an absolute position by bit display can be used.

Furthermore, the mold clamp is conducted at the neighborhood of the uppermost dead point of the toggle mechanism, whereby the mold clamping can be conducted at a very low speed. Accordingly, only a little shock arises at the mold clamping, whereby the molds are prevented from being damaged, and the lives of the molds are enhanced to a great extent. It is prevented that positional deviations occur in the molds and gold wires of IC are cut off at the mold clamping, thereby enhancing the reliability of the semiconductor device.

Figure 9:
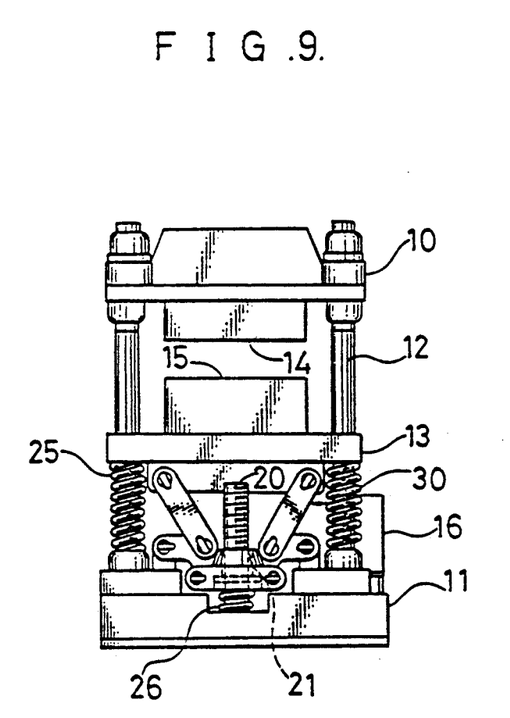
FIG. 9 is a schematic view showing a construction of a second embodiment.

FIG. 9 shows a second embodiment of the present invention. This embodiment requires less motor power during raising of the movable platen, thereby may be miniaturized. This object is accomplished by providing a spring for urging the movable platen upwards.

In FIG. 9, the reference numeral 25 designates a first coil spring which, provided between the lower platen 11 and the movable platen 13, urges the movable platen 13 upwards. This coil spring 25 is provided in such a manner that the tie bar 12 is inserted into the coil spring 25. The numeral 26 designates a second coil spring provided between the nut housing 31 of the double toggle mechanism 30 and the lower platen 11, that is, between the driving force conversion mechanism in the motive power transmission system (comprising the ball screw 20 and the nut 21) and the double toggle mechanism 30. It is sufficient for the first coil spring 25 to have a short stroke but is required to have a large spring constant because it is provided beyond the double toggle mechanism 30 in the motive force transmission system. The second coil spring 26 may have a small spring constant but is required to have a long stroke because it is provided at a former stage than the double toggle mechanism 30.

The operation of this embodiment is approximately the same as that of the first embodiment. However, the nut housing 31 and the movable platen 13 are urged upwards by the second and first coil springs 26 and 25 at the mold clamping, and therefore, the motor power at the rising of the movable platen 13 is reduced to a great extent. Accordingly, the motive force transmission system can be constructed by a transmission system having two reduction ratios, with the larger one of them for obtaining a desired mold clamping pressure, and then the motor 16 itself is miniaturized.

Even if an abnormality arises in the electricity system or the driving system, which prevents the movable platen 13 from completely rising, the coil springs 25 and 26 can operate as buffer elements, thereby preventing the movable platen 13 from lowering suddenly.

In the illustrated embodiment a first coil spring is provided between the movable platen and the lower platen, and a second coil spring is provided between the double toggle mechanism and the driving force conversion mechanism, but only one of them may be provided.

Furthermore, the fundamental principle of the embodiment can be applied to a plastic molding device having no double toggle mechanism.

A third embodiment of the present invention will be described for use with the embodiment of FIG. 2. This embodiment is aiming at conducting a control of the press pressure easily and at high precision. The whole construction thereof is the same as that shown in FIG. 2. The position detection means 40 in this embodiment is constituted so as to detect relative positions of the upper mold 14 and the movable platen 13, and the control apparatus 50 is constructed so as to control the driving of the AC servomotor 16 so that the relative position of the upper mold 14 and the movable platen 13 becomes a desired one, with receiving the output signal of the rotary encoder 42 of the position detection means 40.

The fundamental principle of the motor driving control in this embodiment will be described.

It is well known that when a substance is pressed (or pulled) by a predetermined force, the following relationship is established between the stress $\alpha$ which arises within the substance, the elastic distortion $\epsilon$, and the Young ratio of the substance $E$ $$\alpha = \epsilon \cdot E \qquad (1)$$

In this embodiment it is intended to move the movable platen 13 up to a position where an elastic distortion $\epsilon$ arises and the press pressure is equal to the target pressure with the use of the data of the relative position between the upper mold 14 and the movable platen 13 which is obtained by the position detection means, on an assumption that the press pressure of the movable platen 13 corresponds to the stress $\sigma$, and the relative position between the upper mold 14 and the movable platen 13, that is, the displacement of the movable platen 13 corresponds to the elastic distortion $\epsilon$. Hereupon, the Young ratio B can be easily obtained by calculation or experiment from the whole construction including the upper mold 14, the lower mold 15, and the platens.

The device will be operated as follows:

The operation of this embodiment is basically the same as that of the above embodiment, and only the operation concerning the control of the press pressure will be described.

When the movable platen 13 rises up by the rotation of the AC servomotor 16 and the position at which the upper and the lower molds 14 and 15 contact with each other is detected, a rotation instruction is output from the driving control apparatus 50 to the motor 16, which instruction is for instructing the motor 16 to rotate so as to rise up the movable platen 13 by the amount of displacement x corresponding to a desired press pressure from the contact point. This displacement x can be obtained from the above described formula (1). When the position of the movable platen 13 is detected by the position detection means 40 and the movable platen 13 actually moves by the amount of displacement x, the motor 16 stops. In this state where the mold clamping is conducted at a desired press pressure a plastic molding is conducted. Herein, the relative position of the movable platen 13 and the upper mold 14 is detected similarly as the above embodiment by counting the pulse signals output from the rotary encoder 42 and detecting the position of the movable platen 13.

In this embodiment under such an operation, it is possible to control the press pressure easily and at a high preciseness by only detecting the relative position of the movable platen 13 and the upper mold 14.

As the means for detecting the relative position in this embodiment an encoder which is usually provided at the AC servomotor can be used.

Figure 10:
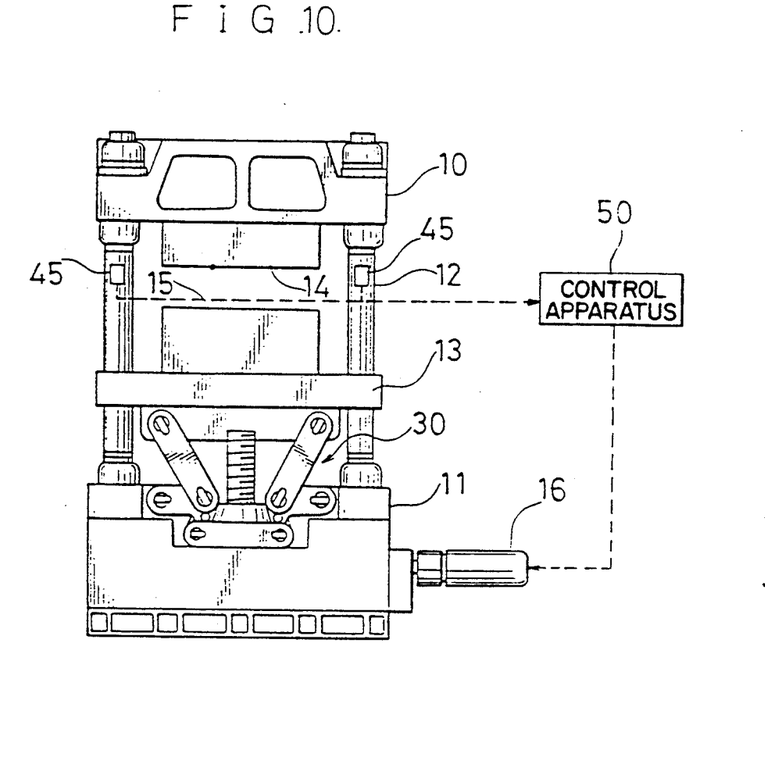
FIG. 10 is a schematic view showing a construction of a fourth embodiment.

FIG. 10 shows a fourth embodiment of the present invention which has a characteristic in the control of the press pressure. This fourth embodiment is constructed to operate in such a manner that the actual press pressure is detected from the distortion which arises at a predetermined position of the device caused by the press, and the driving force of the motor for driving the movable platen is controlled so that the difference between the detected press pressure and the target pressure may become zero.

In FIG. 10, the same reference numerals are used to designate the same or corresponding elements as shown in FIG. 2. The reference numeral 45 designates a strain gage for detecting the distortion of each of four tie bars 12 so as to measure the actual press pressure. The reference numeral 50 designates a control apparatus for controlling the driving force of the AC servomotor 16 so that the difference between the press pressure detected by the strain gage 40 and the target pressure may become zero.

Figure 11:
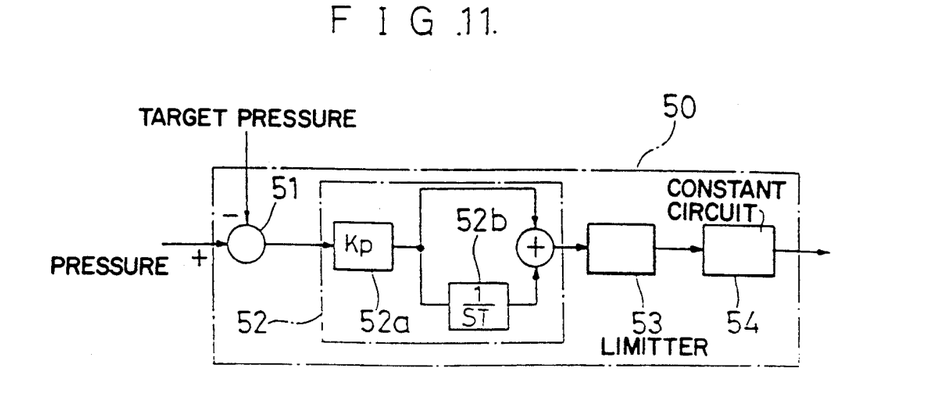
FIG. 11 is a diagrammatic view showing a construction of a control apparatus of the device.

FIG. 11 shows a construction of the control apparatus 50. The numeral 51 designates an adder for conducting a subtraction between the measured press pressure and the target pressure. The numeral 52 designates a proportional integration control section having a proportional element 52a and an integration element 52b. This is intended to conduct a PI control by adding the result of the multiplication of the output of the adder 51 by a proportional constant Kp to the result obtained by further integrating the above-mentioned result of multiplication. The numeral 53 designates a limiter for conducting amplitude limiting of the signal output from the PI control section 52. The numeral 54 designates a constant circuit for converting the output of the limiter 53 into a control signal to be input to the AC servomotor 16.

The device will be operated as follows:

Also in this embodiment the operation is such that the lower mold 15 is pushed towards the upper mold 14 by a predetermined press pressure after the movable platen 13 rises up by the rotation of the AC servomotor 16 as in the above-described embodiments.

In this state the distortion of the tie bar 12, that is, the actual press pressure is detected by the strain gage 45 provided at each tie bar 12. In the control apparatus 50 the difference between the detected press pressure and the target pressure is obtained by the adder 51, and the output thereof is PI controlled by the PI control section 52. The signal obtained in this way is input to the torque limiting signal input terminal of the AC servomotor 16 through the limiter 53 and the constant circuit 54, and the motor 16 is driven under control so that the press pressure of the mold clamping by the lower mold 15 and the upper mold 14 may become the target pressure. Besides, the plastic molding operation thereafter is the same as that of the conventional device.

Herein, the limiter 53 in the control apparatus 50 is intended to suppress the control signal to within a narrow range in a state where the lower mold 15 does not contact with the upper mold 14, that is, no press pressure is measured, whereby the output torque of the motor 16 is limited, for example, in a range of 200% of the predetermined rated torque. Accordingly, even if the movable platen 13 happens to stop rising up due to friction, the rotation torque of the motor 16 does not become a tremendously large value, thereby preventing the device from being destroyed.

In such an embodiment the press pressure which is actually applied is detected by a strain gage 45, and the motor 16 is controlled so that the detected press pressure may become a target pressure, whereby a desired value of press pressure is obtained securely, and adjustment thereof can be conducted easily and at high precision.

Besides, the portion at which the press pressure is to be detected form distortion is not limited to the tie bar described in the above embodiment, and any portion where a distortion arises such as some portion of the upper platen can be used.

A fifth embodiment of the present invention will be described with reference to FIG. 12. This embodiment is aiming at simplifying the structure while avoiding oil leakage by using a belt transmission system in the motive force transmission.

Figure 12:
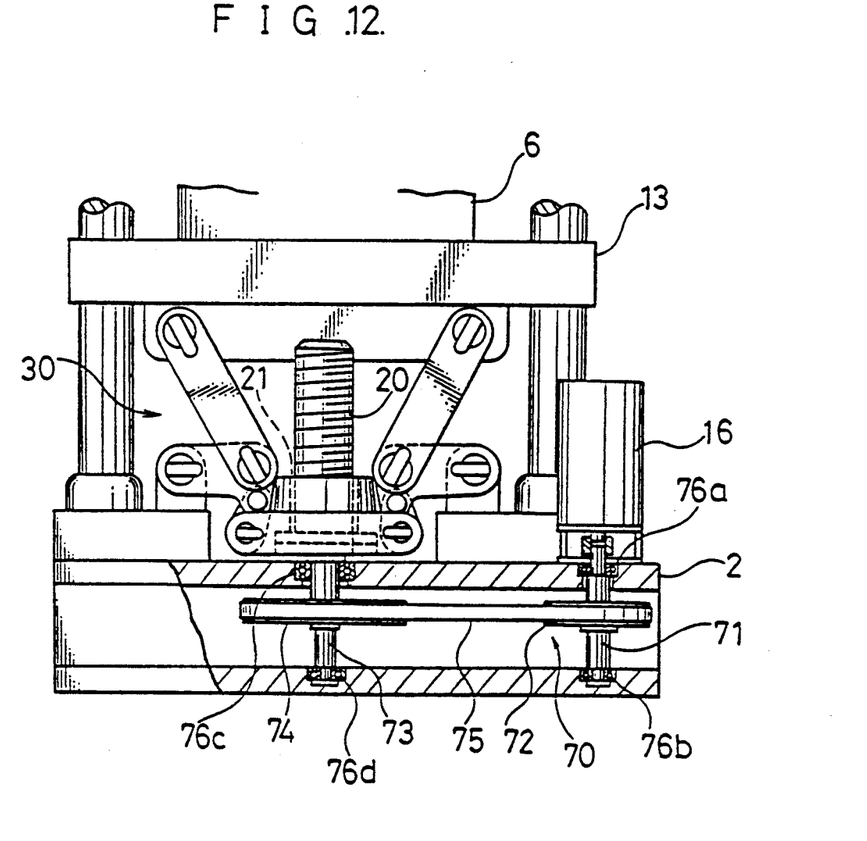
FIG. 12 is a schematic view showing a main portion of a fifth embodiment.

FIG. 12 shows an enlarged view of the motive force transmission system and the double toggle mechanism.

The motive force transmission system is constituted in one series, and in such a construction it is possible to realize a device capable of obtaining a mold clamping force up to about 80 tons with the use of an AC servomotor of 5 KW, or that capable of obtaining a mold clamping force up to about 150 tons with the use of a servomotor of 7 KW, with a little variation depending on the reduction ratio of the motive force transmission system.

In FIG. 12, the same numerals designate same elements as those shown in FIG. 2. The numeral 70 designates a motive force transmission system for transmitting the rotation force of the AC servomotor 16 to the ball screw 20 by a belt 75. In this motive force transmission system 70 the numeral 71 designates an input axis connected to the output axis of the motor 16, the numeral 72 designates a small pulley fixed to the input axis 71, the numeral 73 designates an output axis provided at and integral with the top end of the ball screw 20. The numeral 74 designates a large pulley fixed to the output axis 73, and the numeral 75 designates the belt hung in parallel over the small pulley 72 and the large pulley 74. The numerals 76a to 76d designate bearings for supporting the input axis 71 and the output axis 73 rotatably.

The device will be operated as follows:

At first, when the operation start switch of the device is turned on, the AC servomotor 16 starts to rotate, and the input axis 71 and the small pulley 72 rotate at the same speed as that of the motor 16. This rotation force is transmitted to the large pulley 74 and the output axis 73 through the belt 75, and the ball screw 20 is rotated at a predetermined rotation speed. The rotation speed of the ball screw 20 is determined by the reduction ratio determined by the radius ratio of the small pulley 72 and the large pulley 74. When this ball screw 20 rotates, the nut engaged with the ball screw 20, that is, the nut housing 31 rises up, and thus the rotation force of the motor 16 is converted into a reciprocative force, and this reciprocative force is transmitted to the movable platen 13 through the double toggle mechanism 30.

Besides, the operation of the sections other than the motive force transmission system is the same as those of the above described embodiments.

In this embodiment, the motive force transmission system is constituted by a belt mechanism, thereby simplifying the structure as compared with the bigear transmission system in the above-described embodiments. The number of elements is reduced thereby simplifying the construction of the device. The cost of the device is also reduced. There is no need to provide oil for lubricating gears, thereby preventing anxiety with regard to oil leakage, resulting in easy maintenance. Furthermore, there are no gears, resulting in no noises of gear tooth sounds. This offers low noise devices as compared with the above-described embodiments.

In the above-illustrated embodiment, the motive force transmission system is constituted by only one stage, but this can be constituted in a two-stage construction such as comprising a first stage for high speed forwarding having a small reduction ratio and a second stage for mold clamping having a large reduction ratio, thereby enabling a large mold clamping force by a small motor.

In all the embodiments a ball screw which is rotated by a motor and a nut which is engaged with the ball screw are used as a driving force conversion mechanism, but this invention is not limited thereto and any construction capable of converting the rotation force to a reciprocative force can be used.

Figure 13:
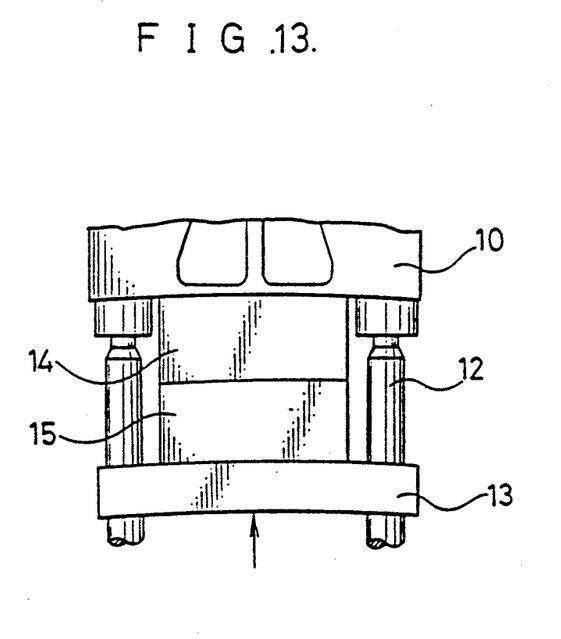
FIG. 13 is a schematic view showing a mold clamping state of a prior art device.

In conducting a mold clamping in the prior art device the weight is usually applied to the center portion of the mold, and therefore the meeting face of the molds is curved convex towards upwards as shown in FIG. 13. (In this Figure a quite large distortion is shown for explanation.) However, the surface of the metal mold is finished to a quite high precision of micron unit, and therefore if the molds are distorted in the above-described manner, a dimensional deviation occurs in the metal molds, thereby hurting the precision of the plastic molding.

Figure 14:
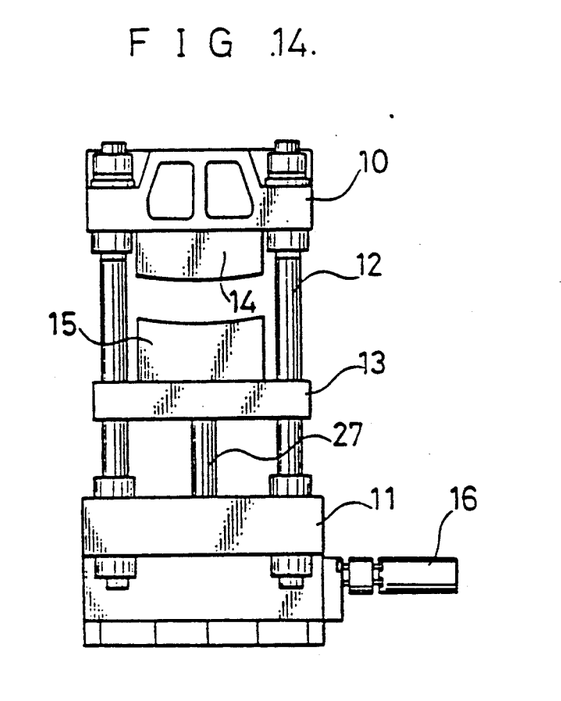
FIG. 14 is a schematic view showing a construction of a sixth embodiment.

A sixth embodiment of the present invention aiming at solving this problem is shown in FIG. 14. The numeral 27 designates a driving rod 27 for pressing the central portion of the movable platen 13 by the driving force of the AC servomotor 16. In this embodiment a driving force conversion mechanism for converting the rotation force of the AC servomotor 16 into a reciprocative force is provided similarly as in the above-described embodiments, and the driving rod 27 is provided to be driven by the reciprocative force obtained by the driving force conversion mechanism. The upper mold 14 and the lower mold 15 in this embodiment are produced curved convex towards downwards, that is, convex towards the press side so that the meeting surface may become flat while mold clamping. In other words, they are produced curved in a reverse direction by that amount they are curved in the mold clamping. The quantity to be curved previously is determined by the press pressure and the rigidness of the structural elements such as platens and upper and lower molds.

Figure 15:
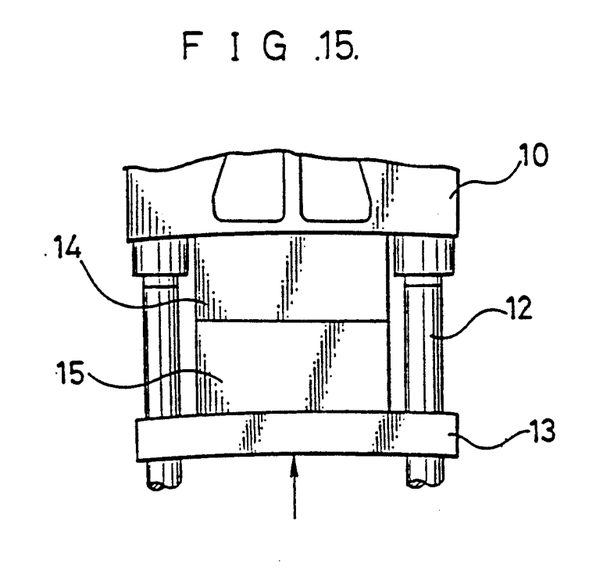
FIG. 15 is a schematic view showing the mold clamping state of the device.

In this embodiment under such construction, the surfaces of the upper and lower molds 14, 15 are produced curved convex downwards, whereby even if the movable platen 13 and the upper platen 10 are curved by the mold clamping, the meeting surface of the molds for conducting plastic molding becomes flat as shown in FIG. 15. Accordingly, no dimensional deviation occurs caused by distortion in a plastic molding conducted in this state, resulting in a high quality plastic molding.

In the above illustrated embodiment the upper and lower molds are previously designed to be curved, but the upper platen and the movable platen may be previously designed to be curved by a predetermined quantity with the same effect as described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plastic molding device for plastic molding a semiconductor element on a lead frame comprising:
   an upper platen, a lower platen, and a movable platen which are all interconnected by at least one tie bar;
   an upper metal mold and a lower metal mold provided on the upper platen and the movable platen, respectively;
   a motor for outputting a rotation force;
   a driving force conversion mechanism for converting the rotation force of the motor into a reciprocative force to enable reciprocation of said movable platen toward said upper platen; and
   a spring for urging the movable platen toward said upper platen, said spring being provided between the lower platen and the movable platen.

* * * * *